(12) United States Patent
Yan et al.

(10) Patent No.: US 10,065,119 B2
(45) Date of Patent: Sep. 4, 2018

(54) GAME ACCESSING METHOD AND PROCESSING METHOD, SERVER, TERMINAL, AND SYSTEM

(71) Applicant: TENCENT TECHNOLOGY (SHENZHEN) COMPANY LIMITED, Shenzhen (CN)

(72) Inventors: Min Yan, Shenzhen (CN); Yiping Guo, Shenzhen (CN); Jianghao Zhu, Shenzhen (CN); Siquan Chen, Shenzhen (CN); Jun Zhang, Shenzhen (CN); Yong Fan, Shenzhen (CN); Jun Yuan, Shenzhen (CN); Xin Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/791,363

(22) Filed: Oct. 23, 2017

(65) Prior Publication Data
US 2018/0043264 A1  Feb. 15, 2018

Related U.S. Application Data

(63) Continuation of application No. 14/418,538, filed as application No. PCT/CN2014/080576 on Jun. 24, 2014, now Pat. No. 9,925,465.

(30) Foreign Application Priority Data

Jun. 27, 2013 (CN) .......................... 2013 1 0263608

(51) Int. Cl.
| | | |
|---|---|---|
| A63F 13/00 | (2014.01) | |
| A63F 13/71 | (2014.01) | |
| H04L 29/06 | (2006.01) | |
| A63F 13/213 | (2014.01) | |
| A63F 13/533 | (2014.01) | |
| A63F 13/30 | (2014.01) | |

(52) U.S. Cl.
CPC ............ *A63F 13/71* (2014.09); *A63F 13/213* (2014.09); *A63F 13/30* (2014.09); *A63F 13/533* (2014.09); *H04L 67/38* (2013.01); *H05K 999/99* (2013.01)

(58) Field of Classification Search
CPC .................................. A63F 13/12; A63F 13/31
See application file for complete search history.

(56) References Cited

U.S. PATENT DOCUMENTS

2006/0063590 A1  3/2006  Abassi et al.
2011/0314153 A1  12/2011  Bathiche et al.
(Continued)

FOREIGN PATENT DOCUMENTS

CN  101075941 A  11/2007
CN  102255896 A  11/2011
(Continued)

*Primary Examiner* — Reginald Renwick
(74) *Attorney, Agent, or Firm* — Anova Law Group, PLLC

(57) ABSTRACT

A method including generating, by a terminal, a creation request containing game information, sending, by the terminal, the creation request to a game server, receiving, by the terminal, a graphic information code generated by a management server according to the game information, and displaying the graphic information code on the terminal.

17 Claims, 6 Drawing Sheets

(56) References Cited

U.S. PATENT DOCUMENTS

| | | | |
|---|---|---|---|
| 2012/0198531 A1 | 8/2012 | Ort et al. | |
| 2014/0141864 A1* | 5/2014 | Ward | G07F 17/34 463/25 |
| 2014/0162759 A1* | 6/2014 | Arnone | G07F 17/3227 463/24 |
| 2014/0349746 A1* | 11/2014 | Boudville | A63F 13/335 463/29 |
| 2014/0364204 A1 | 12/2014 | Törnqvist | |

FOREIGN PATENT DOCUMENTS

| | | |
|---|---|---|
| CN | 102685096 A | 9/2012 |
| CN | 102868696 A | 1/2013 |
| CN | 102929595 A | 2/2013 |
| CN | 103327109 A | 9/2013 |

\* cited by examiner

GAME ACCESSING METHOD AND PROCESSING METHOD, SERVER, TERMINAL, AND SYSTEM

CROSS-REFERENCE TO RELATED APPLICATIONS

This application is a continuation application of U.S. patent application Ser. No. 14/418,538, filed on Jan. 30, 2015. U.S. patent application Ser. No. 14/418,538 is a national stage entry of PCT Patent Application No. PCT/CN2014/080576, filed on Jun. 24, 2014, which claims priority to Chinese Patent Application No. 201310263608.9, filed on Jun. 27, 2013, the entire contents of all of which are incorporated herein by reference.

TECHNICAL FIELD

The disclosure relates to game applications and, more particularly, to game access methods, game processing methods, servers, terminals, and systems.

BACKGROUND

Virtual electronic games provided through computers, handheld devices, or other electronic devices are very common. These games provide users with convenient and efficient ways of recreation.

Various gaming platforms are provided to satisfy different user needs. A conventional game platform, such as a game hall, allows various users who are interested in a same game to play together. For example, in card games, by providing, e.g., a "room number" and a "table number," multiple users can be brought together to play games.

With conventional technologies, even if two users stay together and use a same game hall, once one user creates a game, it is still necessary for him/her to provide the other user with the identification and address of the game, by for example verbal notice or instant messages, such that the other user can find the created game by manual search or by entering the game address in the corresponding game directory. The conventional methods require manual operation, and are relatively time-consuming.

SUMMARY

In accordance with the disclosure, there is provided a method including generating, by a terminal, a creation request containing game information, sending, by the terminal, the creation request to a game server, receiving, by the terminal, a graphic information code generated by a management server according to the game information, and displaying the graphic information code on the terminal.

Also in accordance with the disclosure, there is provided a game processing method including receiving, by a management server, a notification message sent by a game server. The notification message comprises a user identification of a terminal and game information identifying a game created by the game server for the terminal. Some methods further includes generating, by the management server, a graphic information code according to the game information, and sending, by the management server, the graphic information code to the terminal according to the user identification Also in accordance with the disclosure, there is provided a management server including a receiving module and a sending module. The receiving module is configured to receive a notification message sent by a game server. The notification message comprises a user identification of a terminal and game information identifying a game created by the game server for the terminal. The sending module is configured to generate a graphic information code according to the game information, and send the graphic information code to the terminal according to the user identification.

Also in accordance with the disclosure, there is provided a terminal including a request generation module and a display module. The request generation module is configured to generate a creation request containing game information, and send the creation request to a game server. The display module is configured to display a graphic information code received from a management server. The graphic information code is generated according to the game information.

Also in accordance with the disclosure, there is provided a system including a terminal, a game server, and a management server. The terminal is configured to generate a creation requests containing game information, and send the creation request to the game server. The game server is configured to create a game indicated by the game information, generate a notification message carrying a user identification of the terminal and the game information, and send the notification to the management server. The management server is configured to generate a graphic information code according to the game information, and send the graphic information code to the terminal according to the user identification. The terminal is further configured to display the graphic information code.

Also in accordance with the disclosure, there is provided a non-transitory computer-readable storage medium storing a program. The program, when executed, causes a terminal to generate a creation request containing game information, send the creation request to a game server, receive a graphic information code generated by a management server according to the game information, and display the graphic information code.

Also in accordance with the disclosure, there is provided a non-transitory computer-readable storage medium storing a program. The program, when executed, causes a management server to receive a notification message sent by a game server. The notification message carries a user identification of a terminal and game information identifying a game created by the game server for the terminal. The program also causes the management server to generate a graphic information code according to the game information, and send the graphic information code to the terminal according to the user identification.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the disclosure include a method, a server, a terminal, and a system for game accessing and game processing.

Figure 1:
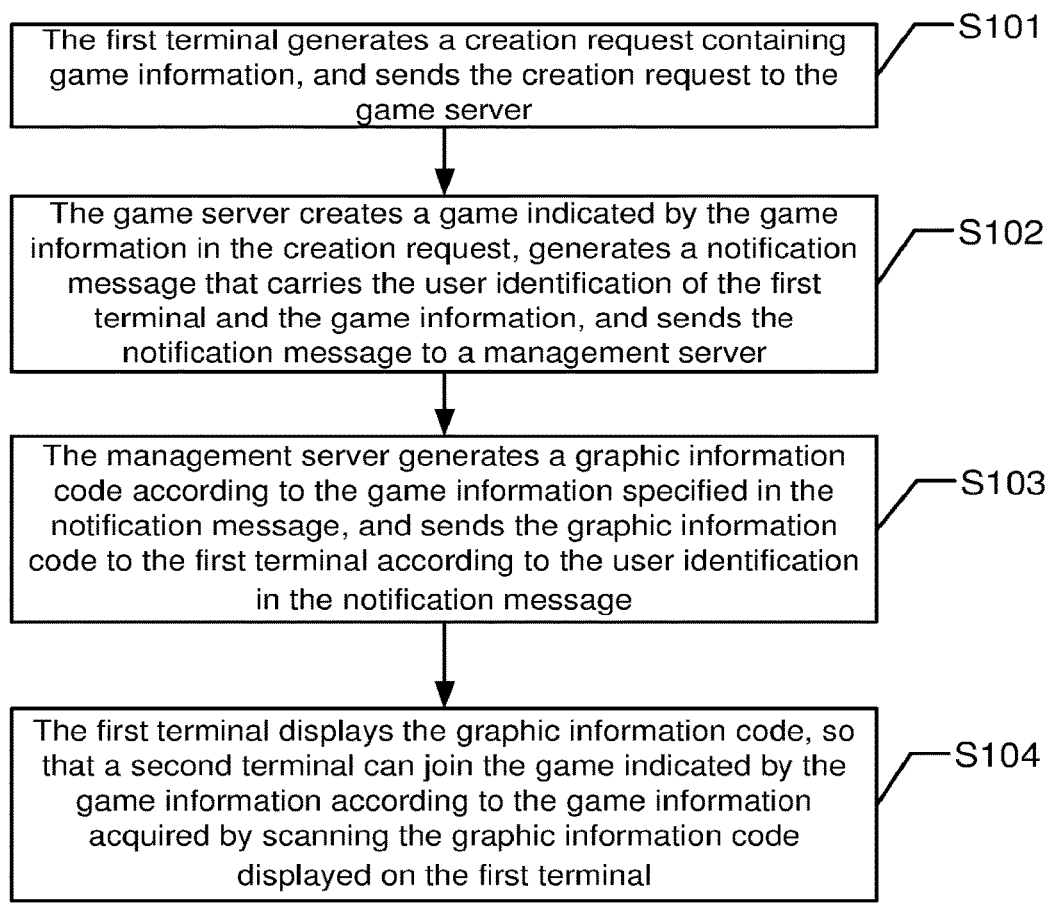
FIG. 1 is a flow chart showing a game accessing method according to an exemplary embodiment.

FIG. 1 is a flow chart showing an exemplary game accessing method 100 consistent with embodiments of the disclosure. The method 100 may be used in an intelligent device with a network capability, such as, for example, a tablet computer, a mobile phone, an electronic reader, a remote control device, a personal computer, a notebook computer, on-board equipment, a network television, or a wearable device.

As shown in FIG. 1, at S101, the first terminal generates a creation request containing game information, and sends the request to a game server.

In some embodiments, the first terminal may be an intelligent device with a network capability, such as the above-mentioned tablet computer, mobile phone, electronic reader, remote control device, personal computer, notebook computer, on-board equipment, network television, or wearable device. Via the first terminal, a user may log into a game hall using a game account or a third party account, i.e., a user identification. In some embodiments, the game hall may be implemented as a game hall application. The user may then directly join a game using a user account, or initiate a creation request to create a new game (such a user is also referred to as a creating user).

The game information may include information such as a game ID and a game address. The game ID indicates a type of the game the user wishes to create. The game ID may include, for example, a card game ID, a sports game ID, or a life simulation game ID. The game address may include information that uniquely identifies a location of the creating user in a game server corresponding to the game ID, such as, for example, a "room number" or a "table number."

The first terminal may acquire the game information by requiring the user to enter or select the game ID and game address in a user interface of the game hall. The first terminal may send a creation request containing the game information to the game server via a game proxy server.

At S102, the game server creates a game indicated by the game information in the creation request, generates a notification message that carries the user identification of the first terminal and the game information, and sends the notification message to a management server.

In some embodiments, according to the game information in the creation request, the game server allocates software and hardware resources to finalize the creation of the game indicated by the game information, and provides the game to the user of the first terminal. Meanwhile, the game server sends a notification message to the management server connected to the game server. The notification message comprises the user identification of the first terminal and the game information used to create the game for the first terminal. The user identification includes the game account used on the first terminal to log into the game hall.

At S103, the management server generates a graphic information code according to the game information specified in the notification message, and sends the graphic information code to the first terminal according to the user identification in the notification message. The graphic information code may include a two-dimensional code, or any graph, such as a one-dimensional code (a bar code), created by an encoding method using geometric graphic identification information.

In some embodiments, the management server may be a server that manages the user account (user identification), records a user state, completes calls for game users, and maintains game data when users play game and other relevant game data. For example, the management server may be a game hall server. The management server generates the graphic information code according to the game information in the notification message, and sends the graphic information code to the first terminal, so that the first terminal may display the graphic information code in the game hall, such as a game hall application.

At S104, the first terminal displays the graphic information code, so that a second terminal can join the game indicated by the game information according to the game information acquired by scanning the graphic information code displayed on the first terminal.

In some embodiments, the second terminal also includes an intelligent device with a network capability, such as the above-mentioned tablet computer, mobile phone, electronic reader, remote control device, personal computer, notebook computer, on-board equipment, network television, or wearable device.

A user who wishes to join the game created by the first terminal may acquire the game information by scanning the graphic information code displayed on the first terminal using the corresponding second terminal. The second terminal sends an access request to the game server according the game information. According to the game information in the access request sent by the second terminal, the game server enables the second terminal to access the game created for the first terminal.

As described above, according to the method consistent with embodiments of the disclosure, a game is created according to game information in a request sent by a first terminal and a graphic information code corresponding to the game information of the created game is acquired. Other users can directly acquire the game information of the created game by scanning the graphic information code, and access the corresponding game. Accordingly, users do not need to manually join the game by entering information such as game address. This facilitates the access to the created game.

Figure 2:
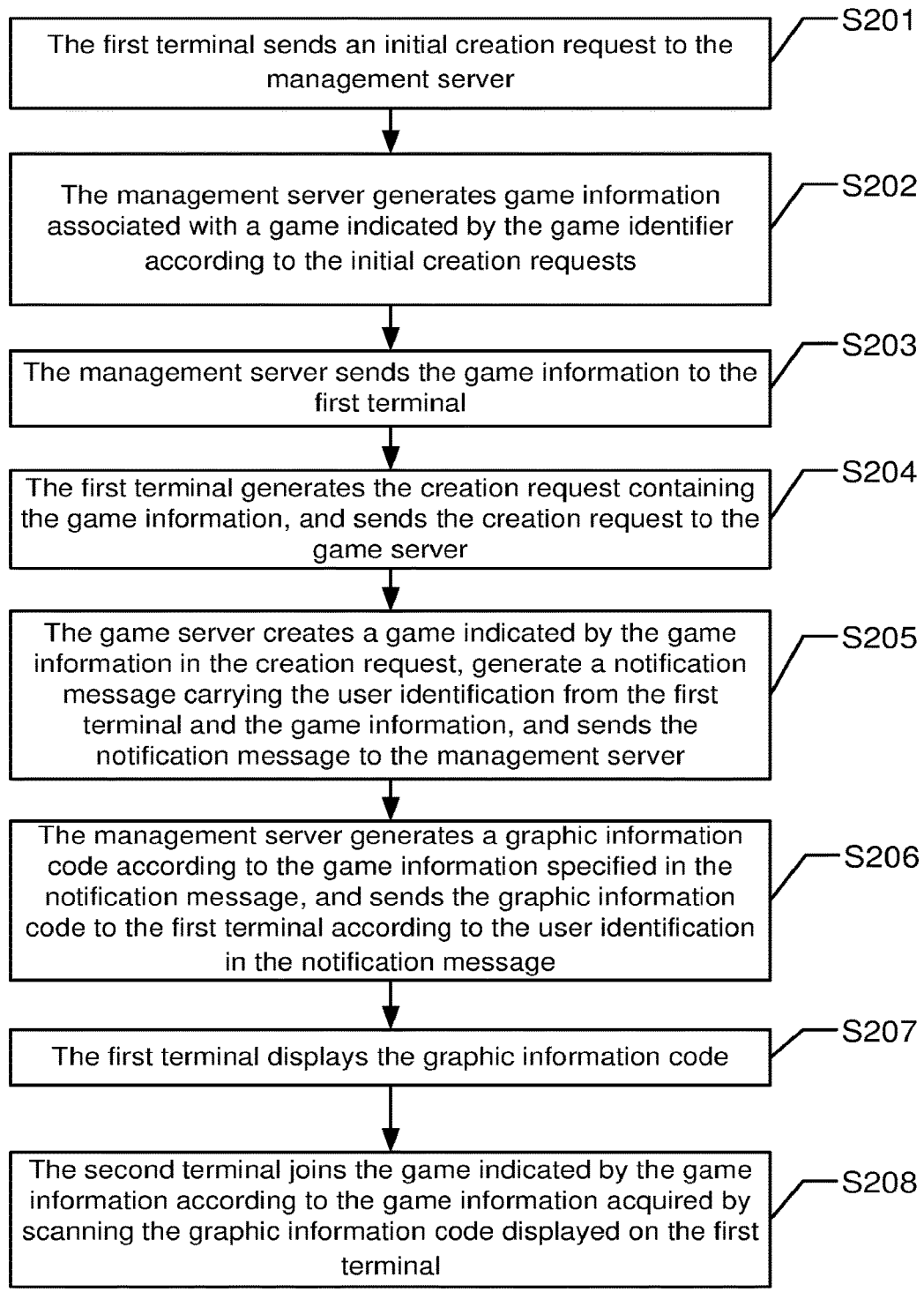
FIG. 2 is a flow chart showing a game accessing method according to an exemplary embodiment.

FIG. 2 is a flow chart showing an exemplary game accessing method 200 consistent with embodiments of the disclosure. The method 200 may be used in an intelligent device with a network capability, such as, for example, a tablet computer, a mobile phone, an electronic reader, a remote control device, a personal computer, a notebook computer, an on-board equipment, a network television, a wearable device.

As shown in FIG. 2, at S201, the first terminal sends an initial creation request to the management server. The initial creation request carries a game identifier.

In some embodiments, various game applications, such as the game hall application, are installed on the first terminal. The user of the first terminal may, after logging in using his/her game account (user identifier), select creating a game in the game hall application. According to the user's selection, the first terminal sends an initial creation request to the management server, i.e., the game hall server, corresponding to the game hall application.

Specifically, after the first terminal starts the corresponding game hall application, the first terminal displays a game access user interface. With the user interface, the user can choose to create a game, or to start a camera module to scan the graphic information code displayed on another terminal to access a certain game.

Thus, in some embodiments, after starting the game hall application and before sending the initial creation request, the first terminal displays the game access user interface, which includes a button prompting to create a new game and a button prompting to scan the graphic information code to join an existing game. When detecting that the user has selected the button for creating a new game, the first terminal generates the creation request containing the game information, and sends the creating request to the game server.

At S202, the management server generates game information associated with a game indicated by the game identifier according to the initial creation requests. The game information includes the game identifier and a game address.

At S203, the management server sends the game information to the first terminal.

That is, the management server generates the game information according to the user's initial creation request, and sends the game information to the first terminal, so that the first terminal can send a creation request containing the game information to the game server.

At S204, the first terminal generates the creation request containing the game information, and sends the creation request to the game server.

At S205, the game server creates a game indicated by the game information in the creation request, generate a notification message carrying the user identification from the first terminal and the game information, and sends the notification message to the management server.

At S206, the management server generates a graphic information code according to the game information specified in the notification message, and sends the graphic information code to the first terminal according to the user identification in the notification message.

At S207, the first terminal displays the graphic information code.

At S208, the second terminal joins the game indicated by the game information according to the game information acquired by scanning the graphic information code displayed on the first terminal.

In some embodiments, the second terminal starts a camera to scan the graphic information code displayed on the first terminal, to acquire the corresponding game information. Specifically, after the user of the second terminal starts the game hall application on the second terminal, the second terminal similarly displays the game access user interface. According to the access user interface, the user of the second terminal can choose to create a game, or to start the camera module to scan the graphic information code on another terminal to access a certain game.

Prior to joining the game indicated by the game information, the second terminal displays the game access user interface, which includes a button prompting to create a new game and a button prompting to scan the graphic information code to join an existing game. When detecting that the user has selected the button for scanning the graphic information code to join the existing game, the second terminal joins the game indicated by the game information according to the game information acquired by scanning the information graphic code displayed by the first terminal.

Figure 3A:
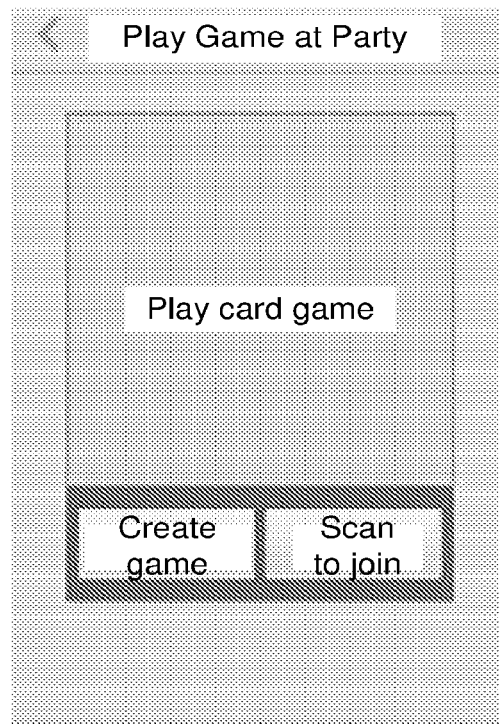
FIGS. 3A and 3B show a game access user interface according to an exemplary embodiment.

FIG. 3A shows an example of the game access user interface discussed above.

The processing method consistent with embodiments of the disclosure will be described in more detail using a card game as an example.

At S1, a game initiator (also referred to as a creating user) logs into the game hall application installed on the user terminal using his/her game account (user identification) and selects the card game, and sends a first game creation request to the game hall server that serves as the management server. The first creation request contains a card game ID.

At S2, the game hall server assigns a room number and a table number to the card game for the game account of the creating user, where the room number and the table number are used as a game address. The game hall server then sends game information containing the card game ID and the game address to the user terminal corresponding to the game account.

At S3, the user terminal sends a second creation request to the game server. The second creation request carries the game information obtained at S2.

At S4, according to the game information in the second creation request, the game server allocates hardware and software resources, finalizes the creation operation of the card game, and connects the creating user corresponding to the game account to the created card game.

At S5, after the game is created, the game server sends the game information and the game account to the game hall server.

At S6, after receiving the game information and the game account of the game server, the game hall server generates a two-dimensional code that identifies the game, and sends the two-dimensional code to the user terminal corresponding to the game account.

Figure 3B:
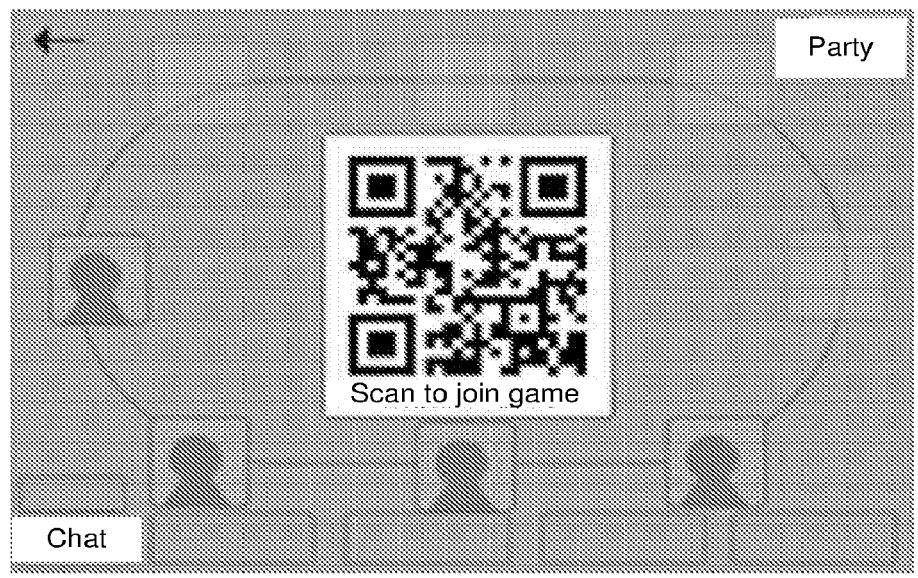

At S7, the user terminal may display the two-dimensional code in a display interface of the corresponding room and table created by the game server, as shown in FIG. 3B.

At S8, another user starts the game hall application on his/her user terminal, and selects "scan to join" in the interface shown in FIG. 3A. The terminal of the other use starts the camera module to scan the two-dimensional code displayed on the creating user's terminal, and obtains the corresponding game information.

At S9, for the terminal of the other user sends an access request to the game server. The access request containing a game account of the other user and the game information obtained at S8.

At S10, according to the received game information, the game server connects the other user corresponding to the game account to the game.

In some embodiments, the management server and the game server may be a same server. In other embodiments, they may be two different servers. A server may serve as only a management server, only a game server, or both a management server and a game server, depending on the setting of its hardware and software.

Consistent with embodiments of the disclosure, a terminal can directly acquire game information from a management server, such as a game hall server, and can create a new game and acquire a graphic information code of game information relating to a created game, according to the acquired game information. Other users can directly acquire the game information of the created game by scanning the graphic information code, and access the corresponding game. Accordingly, users do not need to manually join the game by entering information such as game address. This facilitate the access to the created game.

Figure 4:
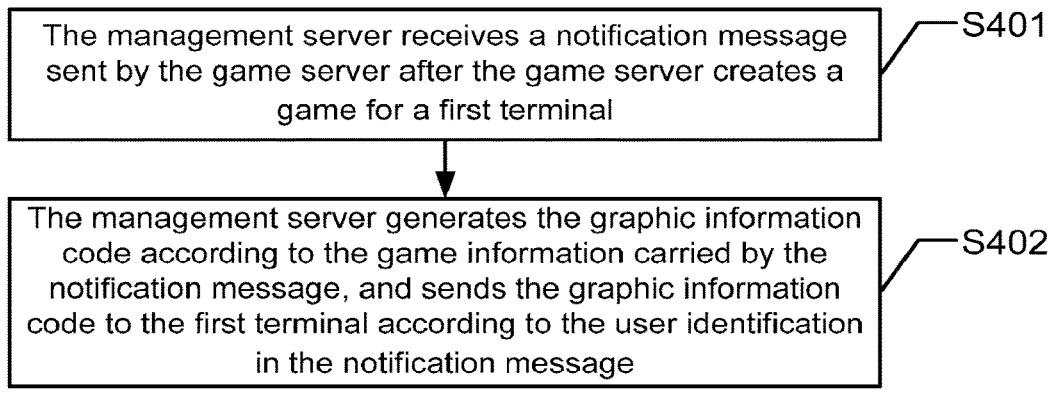
FIG. 4 is a flow chart showing a game processing method according to an exemplary embodiment.

FIG. 4 is a flow chart showing an exemplary game processing method 400 consistent with embodiments of the disclosure. The method 400 may be used in a server managing user accounts (user identifications) and associated game data, such as a game hall server.

As shown in FIG. 4, at S401, the management server receives a notification message sent by the game server after the game server creates a game for a first terminal. The notification message carries a user identification of the first terminal and game information used to identify the created game.

In some embodiments, the game server allocates software and hardware resources according to a creation request sent by the first terminal and creates a corresponding game for the first terminal. Thereafter, the game server sends the game information of the created game to the management server. The management server generates a graphic information code according to the game information sent by the game server. The graphic information code may be generated using an existing method for generating an information-carrying graphic information code.

At S402, the management server generates the graphic information code according to the game information carried by the notification message, and sends the graphic information code to the first terminal according to the user identification in the notification message, so that the first terminal can display the graphic information code.

In some embodiments, before generating the graphic information code, the management server may register the first terminal for the first terminal to acquire the game information.

Specifically, the management server receive an initial creation request sent by the first terminal. The initial creation request carries a game identifier. According to the initial creation request, the management server generates game information associated with a game indicated by the game identifier. The game information includes the game identifier and a game address. The management server then sends the game information to the first terminal.

Figure 5:
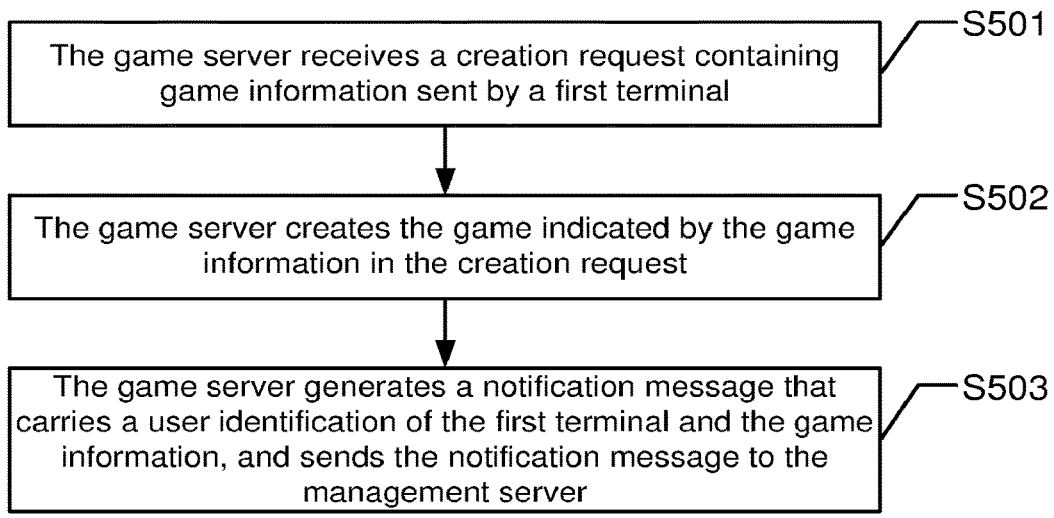
FIG. 5 is a flow chart showing a game processing method according to an exemplary embodiment.

FIG. 5 is a flow chart showing an exemplary game processing method 500 consistent with embodiments of the disclosure. The game processing method 500 may be used in a game server for allocating software and hardware resources, and executing game commands.

As shown in FIG. 5, at S501, the game server receives a creation request containing game information sent by a first terminal.

In some embodiments, the creation request may be sent by a game proxy server of the first terminal. The game proxy server requests, via sitdown message, the game server to allocate hardware and software resources for the first terminal and to create a corresponding game.

At S502, the game server creates the game indicated by the game information in the creation request.

In some embodiments, the game server allocates hardware and software resources, and create the corresponding game according to an existing technology.

At S503, after the game is created, the game server generates a notification message that carries a user identification of the first terminal and the game information, and sends the notification message to the management server, so that the management server can generate a graphic information code according to the game information contained in the notification message. The management server then sends the graphic information code to the first terminal according to the user identification contained in the notification message.

In some embodiments, after the game is created, the first terminal is connected to the game server. The game server generates the notification message and sends the notification message to the management server, so that management server can manage the first terminal. Furthermore, the management server generates the graphic information code according to the game information in the notification message, and sends the graphic information code to the first terminal according to the user identification in the notification message.

Figure 6:
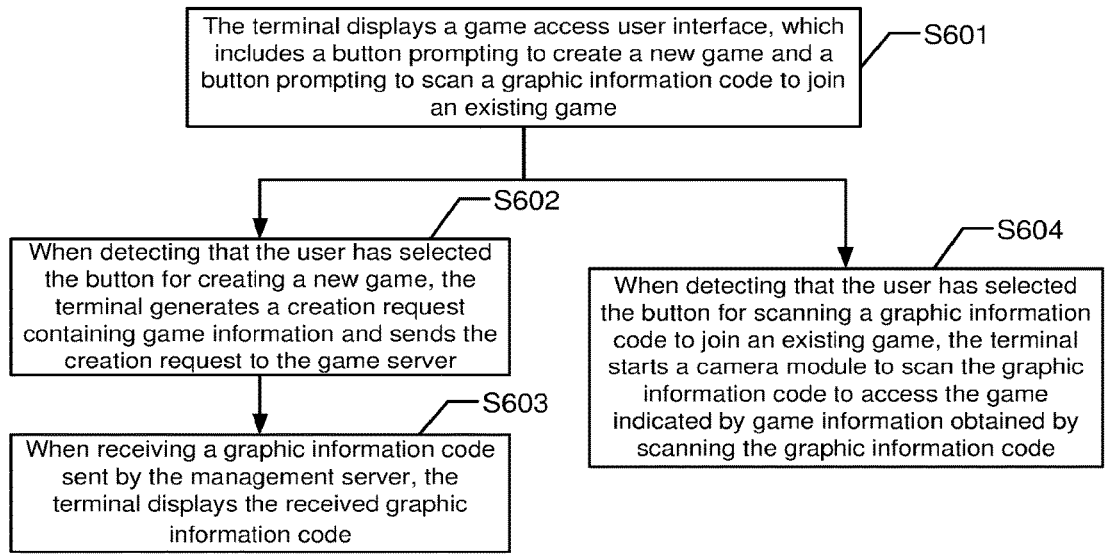
FIG. 6 is a flow chart showing a game accessing method according to an exemplary embodiment.

FIG. 6 is a flow chart showing an exemplary game accessing method 600 consistent with embodiments of the disclosure. The method 600 may be used in an intelligent device with a network capability, such as, for example, a tablet computer, a mobile phone, an electronic reader, a remote control device, a personal computer, a notebook computer, an on-board equipment, a network television, or a wearable device.

As shown in FIG. 6, at S601, the terminal displays a game access user interface, which includes a button prompting to create a new game and a button prompting to scan a graphic information code to join an existing game.

An example of the game access user interface is shown in FIG. 3A. The user can choose one of the two buttons through, for example, a touch on a touch screen or a mouse click.

At S602, when detecting that the user has selected the button for creating a new game, the terminal generates a creation request containing game information and sends the creation request to the game server, so that the game server can create a game according to the game information contained in the creation request.

At S603, when receiving a graphic information code sent by the management server, the terminal displays the received graphic information code.

In some embodiment, the graphic information code is generated by the management server according to the game information, after the game server creates the game and sends the game information to the management server.

At S604, when detecting that the user has selected the button for scanning a graphic information code to join an existing game, the terminal starts a camera module to scan the graphic information code to access the game indicated by game information obtained by scanning the graphic information code.

In some embodiments, after acquiring the game information, the terminal sends an access request containing the game information to the corresponding game server. The game server connects the terminal to the corresponding game according to the access request and the game information in the access request.

Consistent with embodiments of the disclosure, a terminal can directly acquire game information from a management server, such as a game hall server, and can create a new game and acquire a graphic information code of game information relating to a created game, according to the acquired game information. Other users can directly acquire the game information of the created game by scanning the graphic information code, and access the corresponding game. Accordingly, users do not need to manually join the game by entering information such as game address. This facilitate the access to the created game.

Apparatuses and systems consistent with embodiments of the disclosure will be described in detail below.

Figure 7:
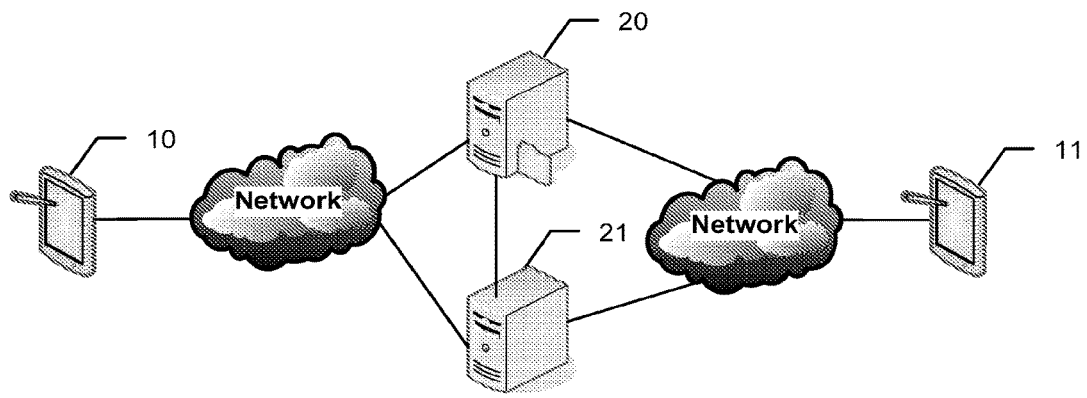
FIG. 7 schematically shows a game access system according to an exemplary embodiment.

FIG. 7 schematically shows a game access system 700 consistent with embodiments of the disclosure. The system 700 may be used to process users' game accessing needs. Consistent with embodiments of the disclosure, the system 700 includes a first terminal 10, a second terminal 11, a management server 20, and a game server 21.

Consistent with embodiments of the disclosure, the first terminal 10 may generate a creation request containing game information, and send the creation request to the game server 21.

The game server 21 may create a game indicated by the game information in the creation request, generate a notification message that carries a user identification of the first terminal and the game information, and send the notification message to the management server 10.

The management server 10 may generate a graphic information code according to the game information contained in the notification message, and send the graphic information code to the first terminal 10 according to the user identification in the notification message.

The first terminal display 10 may then display the graphic information code.

The second terminal 11 may join the game indicated by the game information according to the game information acquired by scanning the graphic information code displayed on the first terminal 10.

In some embodiments, each of the first terminal 10 or the second terminal 11 may be an intelligent device with a network capability, such as a tablet computer, a mobile phone, an electronic reader, a remote control device, a personal computer, a notebook computer, an on-board equipment, a network television, or a wearable device.

In some embodiments, the game information may include information such as a game ID and a game address. The game ID indicates a type of the game the user requires to create at present time. The game ID may include, for example, a card game ID, a sports game ID, or a life simulation game ID. The game address may include information that uniquely identifies a location of the creating user in a game server corresponding to the game ID, such as, for example, a "room number" or a "table number."

The first terminal may acquire the game information by requiring the user to enter or select the game ID and game address in a user interface of the game hall. The first terminal may send a creation request containing the game information to the game server via a game proxy server.

According to the game information in the creation request, the game server 21 may allocate software and hardware resources to finalize the creation of the game indicated by the game information, and provide to the user of the first terminal 10. Meanwhile, the game server 21 may send a notification message to the management server 20 connected to the game server 21. The notification message carries the user identification of the first terminal 10 and the game information used to create the game for the first terminal 10. The user identification includes the game account used on the first terminal 10 to log into the game hall.

The management server 20 may be a server used to manage user accounts (user ID's) and related game data, such as a game hall server. The management server 20 may generate a graphic information code according to the game information in the notification message, and send the graphic information code to the first terminal 10, so that the first terminal 10 can display the graphic information code through a game hall application.

Other users who wish to join the game created by the first terminal 10 may obtain the game information by using corresponding second terminals 11 to scan the graphic information code displayed on the first terminal 10, and send access requests to the game server 21. According to the game information contained in each of the access requests sent by the second terminals 11, the game server 21 may connect the users corresponding to the second terminals 11 to the game created for the first terminal 10.

In some embodiments, the game information in the creation request sent by the first terminal 10 may be acquired from the management server 20, such as the game hall server.

Specifically, the first terminal 10 may send an initial creation request to the management server 10. The initial creation request carries a game identifier.

The management server 10 may generate game information associated with a game indicated by the game identifier according to the initial creation request. The game information includes the game identifier and a game address.

The management server 10 may send the game information to the first terminal 10.

In some embodiments, in addition to generating the creation request containing the game information and sending to the game server 21, the first terminal 10 may further display a game access user interface, which includes a button prompting to create a new game and a button prompting to scan a graphic information code to join an existing game. When detecting that the user has selected the button for creating a new game, the first terminal 10 may generate the creation request containing the game information, and send the creation request to the game server 21.

Further, the second terminal 11 displays the game access user interface for joining the game indicated by the game information according to the game information obtained by scanning the graphic information code displayed on the first terminal 10. The game access user interface displayed on the second terminal 11 includes the button for creating a new game and the button for scanning a graphic information code to join an existing game. When detecting that the user has selected the button for scanning a graphic information code to join an existing game, the second terminal 11 scans the graphic information code displayed on the first terminal 10 to acquire the game information. The second terminal 11 send an access request to the game server 21 according to the acquired game information, so that the game server 21 can connect the second terminal 11 to the game corresponding to the game address included in the game information of the access request.

In some embodiments, the management server 20 and the game server 21 may be a same server. In other embodiments, they may be two different servers. A server may serve as only the management server 20, only the game server 21, or both the management server 20 and the game server 21, depending on the setting of its hardware and software.

Figure 8:
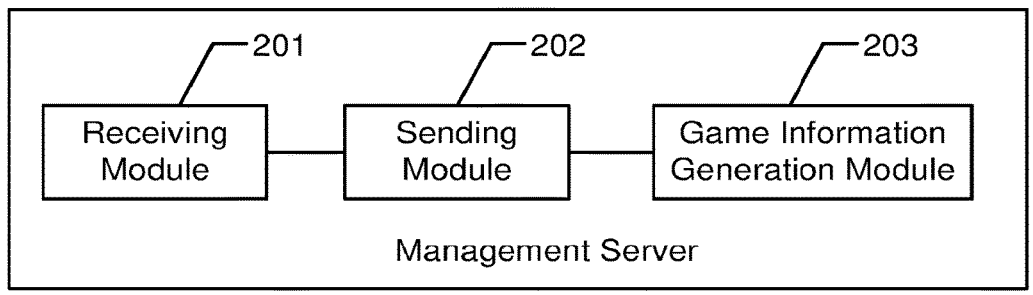
FIG. 8 schematically shows a management server according to an exemplary embodiment.

FIG. 8 schematically shows an exemplary structure of the management server 20 consistent with embodiments of the disclosure. As shown in FIG. 8, the management server 20 includes a receiving module 201, a sending module 202, and a game information generation module 203.

The receiving module 201 is configured to receive a notification message sent by the game server 21 after the game server 21 creates a game for the first terminal 10. The notification message carries a user identification of the first terminal 10 and game information used to identify the created game.

The sending module 202 is configured to generate a graphic information code according to the game information contained in the notification message, and send the graphic information code to the first terminal 10 according to the user identification in the notification message, so that the first terminal 10 can display the graphic information code.

The management server 20 may also automatically generate the game information for the first terminal 10 according to the user's initial creation request. Thus, the receiving module 201 is further configured to receive the initial creation request sent by the first terminal 10. The initial creation request carries a game identifier. The game information generation module 203 is configured to generate game information associated with a game indicated by the game identifier according to the initial creation request. The game information includes the game identifier and a game address. The sending module 202 is further configured to send the game information to the first terminal 10.

Figure 9:
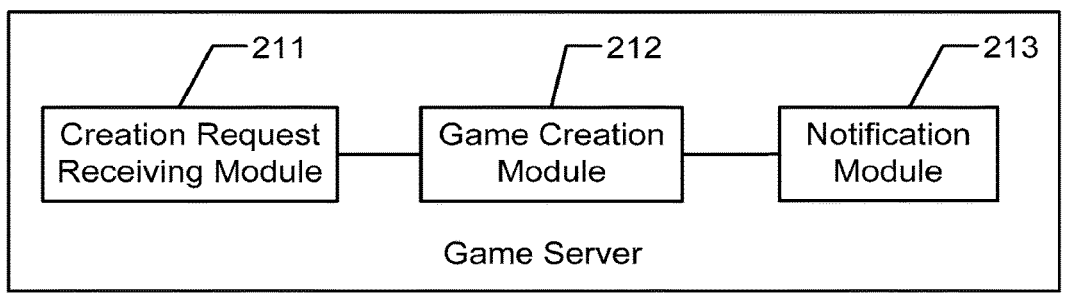
FIG. 9 schematically shows a game server according to an exemplary embodiment.

FIG. 9 schematically shows an exemplary structure of the game server 21 consistent with embodiments of the disclosure. The game server 21 includes a creation request receiving module 211, a game creation module 212, and a notification module 213.

The creation request receiving module 211 is configured to receive a creation request containing game information sent by the first terminal 10.

The game creation module 212 is configured to create a game indicated by the game information in the creation request.

The notification module 213 is configured to generate a notification message after creating the game. The notification message carries a user identification of the first terminal 10 and the game information. The notification module 213 is further configured to send the notification message to the management server 20, so that the management server 20 can generate a graphic information code according to the game information contained in the notification message, and send the graphic information code to the first terminal 10 according to the user identification in the notification message.

In some embodiments, after the game creation module creates the game, the first terminal 10 is connected to the game. The notification module 212 creates the notification message and sends the notification message to the management server 20, so that the management server 20 can manage the first terminal 10, generate the graphic information code according to the game information contained in the notification message, and send the graphic information code to the first terminal 10 according to the user identification in the notification message.

Figure 10:
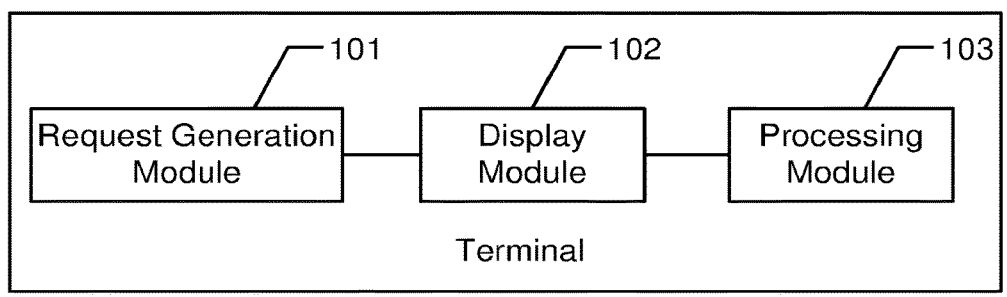
FIG. 10 schematically shows a terminal according to an exemplary embodiment.

FIG. 10 schematically shows an exemplary structure of a game access terminal 1000 consistent with embodiments of the disclosure. The terminal 1000 may be an intelligent device with a network capability, such as a tablet computer, a mobile phone, an electronic reader, a remote control device, a personal computer, a notebook computer, an on-board equipment, a network television, or a wearable device. The terminal 1000 may be any of the first terminal 10 or the second terminal 11. The terminal 1000 includes a request generation module 101, a display module 102, and processing module 103.

The request generation module 101 is configured to generate a creation request containing game information and to send to the game server 21, so that the game server 21 can create a game indicated by game information in the creation request.

The display module 102 is configured to display the received a graphic information code sent by management server 20.

In some embodiments, the graphic information code is generated by the management server 20 according to game information, after the game server 21 creates a game and sends the game information to the management server 20.

The display module 102 is also configured to display the game access user interface, which includes the button prompting to create a new game and the button prompting to scan a graphic information code to join an existing game.

The processing module 103 is configured to notify the request generation module 101 to generate the creation request including the game information and send the creation request to the game server 21, when the user selects the button for creating a new game. The processing module 103 is further configured to start a camera module to scan a graphic information code to join the game indicated by the game information obtained by scanning the graphic information code, when the user selects the button for scanning.

An example of the game access user interface displayed by the display module 102 is shown in FIG. 3A.

One of ordinary skill in the art would understand that all or part of the processes discussed above could be performed by hardware controlled by computer programs. The programs may be stored in a non-transitory computer-readable storage medium including, for example, a disk, an optical disk, a read-only memory (ROM), or a random-access memory (RAM).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A game assessing system, comprising:
   a game server; and
   a management server,
   wherein:
   the game server is configured to:
      receive a creation request containing game information from a first terminal logged in with a user identification of a creating user, wherein the game information includes: a game identifier indicating a type of a game that the first terminal requests to create, and a game address that uniquely identifies a location of the game assigned by the management server to the creating user;
      create the game indicated by the game information and connect the creating user to the created game;
      generate a notification message carrying the user identification of the first terminal and the game information; and
      send the notification message to the management server, and the management server is configured to:
  generate a graphic information code according to the game information specified in the notification message; and
  send the graphic information code to the first terminal according to the user identification, wherein the graphic information code is displayed by the first terminal after the creating user is connected to the created game.

2. The system according to claim 1, wherein:
the graphic information code displayed on the first terminal is scanned by a second terminal to join the game indicated by the game information.

3. The system according to claim 2, wherein the game server is further configured to:
  receive, from the second terminal, an access request corresponding to the game information to join the game, wherein the second terminal is configured to display a game access interface including a first option of creating a game and a second option of joining an existing game, and the access request is generated in response to the second option being selected and the graphic information code displayed by the first terminal being scanned by the second terminal; and
  facilitate the second terminal to access the game based on the access request.

4. The system according to claim 1, wherein the management server is further configured to:
  receive an initial creation request from the first terminal, the initial creation request carrying the game identifier;
  generate the game information associated with the game indicated by the game identifier according to the initial creation request, the game information includes the game identifier and the game address; and
  send the game information to the first terminal, wherein the game information is included in the creation request sent from the first terminal to the game server.

5. The system according to claim 4, wherein:
the first terminal is configured to display a game access interface including a first option of creating a game and a second option of joining an existing game; and
the initial creation request from the first terminal is sent to the management server in response to the first option being selected on the game access interface.

6. The system according to claim 4, wherein:
the game address includes at least one of a virtual room number or a virtual table number assigned to the creating user.

7. The system according to claim 4, wherein the game server is configured to create indicated by the game information by:
  allocating hardware and software resources; and
  finalizing a creation operation of the game.

8. A non-transitory computer-readable storage medium storing computer-executable program that, when being executed by a processor, implementing a game assessing method, the method comprising:
  receiving a creation request containing game information from a first terminal logged in with a user identification of a creating user, wherein the game information includes: a game identifier indicating a type of a game that the first terminal requests to create, and a game address that uniquely identifies a location of the game assigned to the creating user;
  creating the game indicated by the game information and connect the creating user to the created game;
  generating a notification message carrying the user identification of the first terminal and the game information;
  generating a graphic information code according to the game information in the notification message; and
  sending the graphic information code to the first terminal according to the user identification, wherein the graphic information code is displayed by the first terminal after the creating user is connected to the created game.

9. The non-transitory computer-readable storage medium according to claim 8, wherein the graphic information code displayed on the first terminal is scanned by a second terminal to join the game indicated by the game information.

10. The non-transitory computer-readable storage medium according to claim 9, wherein the method further comprises:
  receiving, from the second terminal, an access request corresponding to the game information to join the game, wherein the second terminal is configured to display a game access interface including a first option of creating a game and a second option of joining an existing game, and the access request is generated in response to the second option being selected and the graphic information code displayed by the first terminal being scanned by the second terminal; and
  facilitate the second terminal to access the game based on the access request.

11. The non-transitory computer-readable storage medium according to claim 8, wherein the method further comprises: before receiving the creation request from the first terminal,
  receiving an initial creation request from the first terminal, the initial creation request carrying the game identifier;
  generating the game information associated with the game indicated by the game identifier according to the initial creation request, the game information includes the game identifier and the game address; and
  sending the game information to the first terminal.

12. A non-transitory computer-readable storage medium storing computer-executable program that, when being executed by a processor of a first terminal, implementing a game assessing method, the method comprising:
  generating, by the first terminal logged in with a user identification of a creating user, a creation request containing game information, wherein the game information includes: a game identifier indicating a type of a game that the first terminal requests to create, and a game address that uniquely identifies a location of the game assigned to the creating user;
  sending the creation request to a game server to create a first game corresponding to the game information, wherein the creating user is connected to the first game when the game server creates the first game;
  receiving a first graphic information code generated by a management server according to the game information; and
  displaying the first graphic information code on the first terminal after the creating user is connected to the created game.

13. The non-transitory computer-readable storage medium according to claim 12, wherein the first graphic information code displayed on the first terminal is scanned by a second terminal to join the first game indicated by the game information.

14. The non-transitory computer-readable storage medium according to claim 12, wherein the method further comprises:

sending an initial creation request to the management server, the initial creation request carrying the game identifier;

receiving the game information generated by the management server, wherein the game information is associated with the first game indicated by the game identifier, and includes the game identifier and the game address.

15. The non-transitory computer-readable storage medium according to claim 14, wherein the method further comprises:

displaying a game access user interface including a first option of creating a game and a second option of joining an existing game, wherein the initial creation request is sent in response to the first option being selected.

16. The non-transitory computer-readable storage medium according to claim 12, wherein the method further comprises:

displaying a game access user interface including a first option of creating a game and a second option of joining an existing game, and when the second option is selected, prompting to scan a second graphic information code displayed on a third terminal to join a second game.

17. The non-transitory computer-readable storage medium according to claim 16, wherein the method further comprises:

when detecting that the second option is selected, initiating a camera to scan the second graphic information code.

* * * * *